(12) United States Patent
May et al.

(10) Patent No.: US 8,017,894 B2
(45) Date of Patent: Sep. 13, 2011

(54) IMAGING SYSTEM USING A NEGATIVE INDEX OF REFRACTION LENS

(75) Inventors: Jack May, Foster City, CA (US); Stephen D. Stearns, Saratoga, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1021 days.

(21) Appl. No.: 11/861,862

(22) Filed: Sep. 26, 2007
(Under 37 CFR 1.47)

(65) Prior Publication Data
US 2009/0080070 A1    Mar. 26, 2009

(51) Int. Cl.
*G01C 21/02* (2006.01)
(52) U.S. Cl. .............. 250/203.3; 250/203.6; 250/216; 359/618; 359/642
(58) Field of Classification Search .............. 250/203.1, 250/216, 203.3, 203.6; 359/301, 618, 642
See application file for complete search history.

(56) References Cited

U.S. PATENT DOCUMENTS

| | | | |
|---|---|---|---|
| 6,137,632 A * | 10/2000 | Bernacki | 359/618 |
| 7,177,513 B2 | 2/2007 | Povinelli et al. | |
| 7,193,793 B2 | 3/2007 | Murakami et al. | |
| 7,218,190 B2 | 5/2007 | Engheta et al. | |
| 7,570,221 B2 | 8/2009 | May et al. | |
| 2005/0231826 A1 | 10/2005 | Murakami et al. | |
| 2007/0171536 A1* | 7/2007 | Tsukagoshi | 359/642 |
| 2007/0252980 A1* | 11/2007 | Wang et al. | 356/301 |

FOREIGN PATENT DOCUMENTS

JP    2004163122 A  *  6/2004

OTHER PUBLICATIONS

Borgiotti: "*Modal Analysis of Periodic Planar Phased Arrays of Apertures*"; Proceedings of the IEEE, vol. 56, No. 11, Nov. 1968, pp. 1881-1892.

Chen: "*Diffraction of Electromagnetic Waves by a Conducting Screen Perforated Periodically with Circular Holes*"; IEEE Transactions on Microwave Theory and Techniques, vol. MTT-19, No. 5, May 1971, pp. 475-481.

Chen: "*Transmission Through a Conducting Screen Perforated Periodically with Apertures*"; IEEE Transactions on Microwave Theory and Techniques, vol. MTT-18, No. 9, Sep. 1970, pp. 627-632.

Eleftheriades: "*Planar Negative Refractive Index Media Using Periodically L-C Loaded Transmission Lines*"; IEEE Transactions on Microwave Theory and Techniques, vol. 50, No. 12, Dec. 2002, pp. 2702-2712.

(Continued)

*Primary Examiner* — Georgia Y Epps
*Assistant Examiner* — Kevin Wyatt
(74) *Attorney, Agent, or Firm* — Tarolli, Sundheim, Covell & Tummino LLP

(57) ABSTRACT

Systems and methods for imaging a distant light source at an enhanced resolution is provided. An evanescent field generator an evanescent field generator that receives an incident electromagnetic field representing at least one distant light source and restores high spatial frequency components to the incident electromagnetic field, resulting in an evanescent field. A negative refractive index lens assembly focuses the evanescent field onto a focal plane. A photodetector assembly located in the focal plane detects the focused evanescent field as an image of the at least one distant light source.

13 Claims, 2 Drawing Sheets

OTHER PUBLICATIONS

Engheta: "*A Positive Future for Double-Negative Metamaterials*"; IEEE Transactions on Microwave Theory and Techniques, vol. 53, No. 4, Apr. 2005, pp. 1535-1556.

Pendry: "*Reversing Light with Negative Refraction*"; Physics Today, Jun. 2004, pp. 37-43.

Ramakrishna: "*Physics of Negative Refractive Index Materials* "; Institutes of Physics Publishing, Reports on Progress in Physics, Rep. Prog. Phys. 68 (2005) 449-521.

Vogel, et al.: "*Transmission and Reflection of Metallic Mesh in the Far Infrared*"; Infrared Physics, 1964, vol. 4, pp. 257-262, Pergamon Press Ltd., Printed in Great Britain.

May, et al.: "*Telescope Resolution Using Negative Refractive Index Materials*"; Proceedings of SPIE, vol. 5166, 2004, Bellingham WA; pp. 220-227.

Pedry: "*Negative Refraction Makes a Perfect Lens*"; Physical Review Letters, vol. 85, No. 18, 2000; pp. 3966-3969.

Search Report for corresponding GB 0817652.1; Date of Search Jan. 12, 2009.

N. Amitay and V. Galindo, "The Analysis of Circular Waveguide Phased Arrays", *Bell System Tech. J.*, 47, 1903-1931 (1968).

\* cited by examiner

IMAGING SYSTEM USING A NEGATIVE INDEX OF REFRACTION LENS

RELATED APPLICATIONS

This application is related to the following commonly assigned co-pending patent application entitled: "REDUCED BEAM WIDTH ANTENNA," Ser. No. 11/861,893, of which is being filed contemporaneously herewith and is incorporated herein by reference.

TECHNICAL FIELD

The present invention relates generally to optical and imaging systems, and more particularly to an imaging system having an enhanced resolution.

BACKGROUND OF THE INVENTION

The optical resolution of any conventional telescope is limited by the diffraction limits for the lenses comprising the telescope. The diffraction limit of an optical system defines the theoretical maximum performance of the system for a given wavelength of light. For a telescope having a lens of diameter, a, and focal length, f, the diffraction limit, d, can be expressed as:

$$d = 1.22 \frac{f\lambda}{a} \qquad \text{Eq. 1}$$

where $\lambda$ is the wavelength of the incident light.

As seen in Equation 1, the diffraction limit decreases with decreasing wavelength and/or increasing diameter. Accordingly, for an optical system designed for a given wavelength, the limiting factors on the system performance are the size of the lenses in the optical system and the focal length of the lens. It will be appreciated, however, that there are practical limitations to the maximum size of a telescope lens. Accordingly, the maximum performance of an optical system is limited by currently available materials and fabrication techniques.

SUMMARY OF THE INVENTION

In accordance with an aspect of the present invention, an imaging system having an enhanced resolution is provided. An evanescent field generator receives an incident electromagnetic field representing at least one distant light source and restores high spatial frequency components to the incident electromagnetic field, resulting in an evanescent field. A negative refractive index lens assembly focuses the evanescent field onto a focal plane. A photodetector array located in the focal plane detects the focused evanescent field as an image of the at least one distant light source.

In accordance with another aspect of the present invention, a method is provided for imaging at least one distant source of light. High spatial frequency components are restored to an incident electromagnetic field to produce an evanescent field. The evanescent field is focused by a negative refractive lens to a point in a focal plane. The focused evanescent field is detected in the focal plane.

In accordance with yet another aspect of the present invention, a spatial frequency reconstruction assembly is provided for focusing light from a distant light source. The spatial frequency reconstruction assembly includes a mask comprising a plurality of apertures. The diameter and effective path length of each of the plurality of apertures are selected to apply a desired transfer function to an incident electromagnetic field representing the at least one distant light source to produce an evanescent field. A negative refractive index lens assembly has at least one surface separated by an infinitesimal gap from a surface of the mask. The negative refractive index lens focuses the evanescent field to a focal plan associated with the negative refractive index lens.

DETAILED DESCRIPTION OF INVENTION

In accordance with an aspect of the present invention, an imaging system is provided for imaging one or more distant light sources at an enhanced resolution. High spatial frequencies within electromagnetic radiation tend to attenuate as they propagate over a distance, such that light from a distant source incident on a detector can be approximated as a plane wave. By referring to the light source as "distant", it is meant that the source is sufficiently distant as to register as a point source. To restore the angular spectrum of the incident light, specifically the high spatial frequency components lost during propagation, the electromagnetic field received at the imaging system is perturbed to create a localized field having a rapid variation in field strength over distance, referred to as an evanescent field, and having a specially tailored amplitude and phase characteristic. By restoring the angular spectrum of the incident light, it is possible to produce a field that can be focused. A negative refractive index lens can be positioned as to be separated from to the origin of the evanescent field by no more than an infinitesimal gap (e.g., less than a wavelength) to preserve the field, which is prone to exponential attenuation in positive index of refraction materials. Such materials are also referred to as double negative (DNG) materials and negative index of refraction (NIR) materials. The NRI lens focuses the field into a fractional wavelength focal point representing the light source. The imaging system preserves the spatial displacement of the light sources, such that each of a plurality of light sources will resolve into separate focal points in the focal plane of the lens. By generating the evanescent field and focusing the field with the negative index of refraction lens, it is possible to achieve a resolution superior to even the theoretical maximum performance of a diffraction limited system of comparable size.

Figure 1:
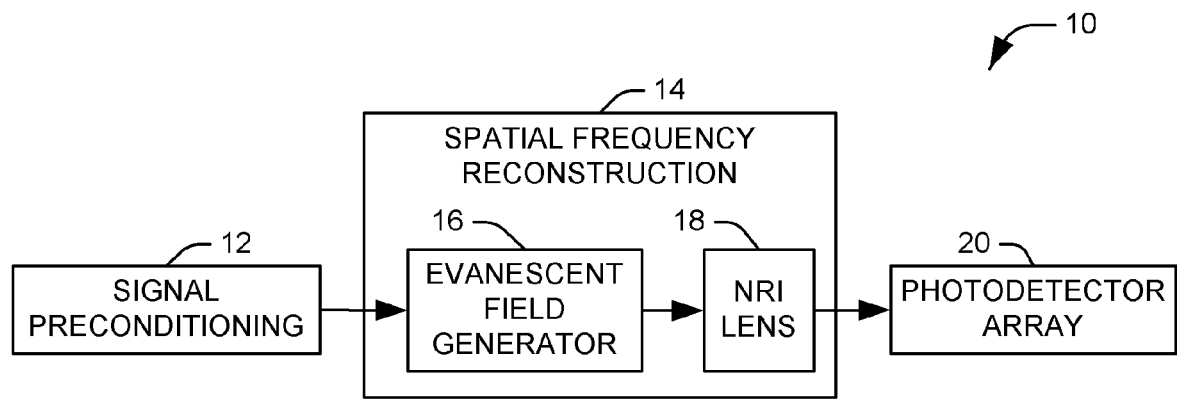
FIG. 1 illustrates an imaging system having an enhanced resolution in accordance with an aspect of the present invention.

FIG. 1 illustrates an imaging system 10 having an enhanced resolution in accordance with an aspect of the present invention. The system 10 includes a signal preconditioning element 12 that directs light from one or more distant light sources onto a spatial frequency reconstruction assembly 14. It will be appreciated that the term "light" is used broadly herein to encompass not only visible light, but any form of electromagnetic radiation, including ultraviolet light, infrared light, and microwaves. In one implementation, the signal preconditioning element 12 can comprise a parabolic mirror. In general, the preconditioning element 12 can comprise a conventional optical system comprising one or more optical elements such as lenses and mirrors. The spatial frequency reconstruction assembly 14 is configured to restore high spatial frequency components to the collected light and focus the light onto an associated focal plane.

The spatial frequency reconstruction assembly 14 comprises an evanescent field generator 16 that generates an evanescent field representing incident light at the imaging system 10. The evanescent field generator 16 spatially samples the incoming electromagnetic field representing the one or more distant light sources and produces an evanescent field which reconstructs or restores the high spatial frequency components needed for sharp focusing at an associated negative refractive index (NRI) lens assembly 18. In one implementation, the evanescent field generator 16 comprises a metallic plate having a plurality of apertures arranged in a rectangular grid. The diameter and effective path length of each of the plurality of apertures can be varied to produce a desired complex gain in the incident field. For example, the holes can be angled or coiled to increase the path length of light traveling through the holes. Alternatively, an appropriate dielectric material can be used to slow the passage of the light through the hole, producing a change in the effective path length of the light at the aperture that causes a desired shift in the phase of the light.

The negative refractive index lens assembly 18 is positioned such that an infinitesimal gap (e.g., with a spacing of less than a wavelength) is present between the negative refractive index lens and the evanescent field generator 16 to mitigate loss in the incident evanescent wave field. The negative refractive index lens 16 has an amplifying effect on the evanescent field, preserving the field across the width of the lens, as well as a focusing effect. The lens effectively sums the various perturbations in the electromagnetic field to one or more focal points, representing the one or more light sources, in a focal plane associated with the lens. The evanescent field generator 16 and the NRI lens 18 can be configured to produce a focal point have a width of less than a wavelength. The negative refractive index lens assembly 18 can be formed from an engineered metamaterial having a negative index of refraction at a band of wavelengths associated with the one or more light sources. In an exemplary embodiment that detects infrared light, the negative refractive index lens assembly 18 can include one or more plates having a thin film of silver.

A photodetector array 20 can be positioned within the focal plane of the NRI lens assembly 18 to detect the focused evanescent field as an image. The photodetector array 20 can comprise any suitable arrangement for detecting light in a band of wavelengths associated with the one or more light sources. The detected image can then be provided to a human operator or subjected to any of a variety of processing techniques to eliminate artifact from the image or extract desired data.

Figure 2:
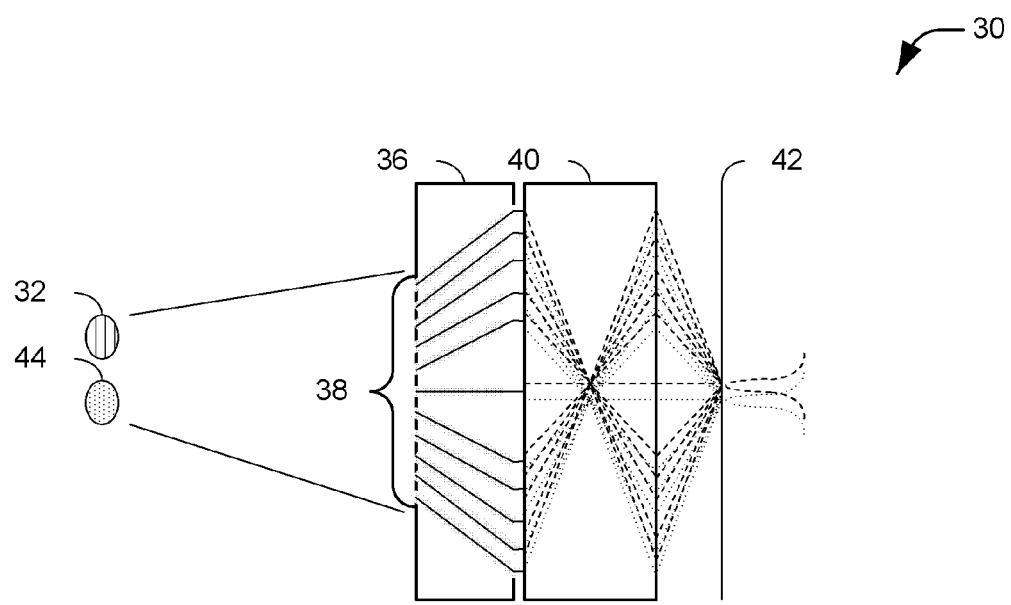
FIG. 2 illustrates a first implementation of an imaging system in accordance with an aspect of the present invention.

FIG. 2 illustrates a first implementation of an imaging system 30 in accordance with an aspect of the present invention. An electromagnetic field representing one or more distant light sources 32 is directed to a mask 36. The mask 36 spatially samples the input electromagnetic field to produce an evanescent field output, $h_D(x,y)$, that is the product of the input field, $g(x,y)$, and a spatial transfer function, $h(x,y)$, imposed by the mask. A desired field in the output plane can be achieved by appropriate design of an array of apertures 38 in the mask 36. The aperture array 38 can be arranged in a regular rectangular lattice spacing, with the diameter and effective path length of each aperture varied to produce a desired complex gain at the aperture. In the illustrated example, the apertures 38 can be made of short circular waveguides of slightly different diameters and lengths to obtain gain and phase control. Accordingly, the spatial variation of the evanescent field output at the mask 36 can be controlled with significant precision to generate a desired field.

For a paraxial optical system, the incident electromagnetic field can be conceptualized as a series of planes that are perpendicular to the optical axis, which will be defined as the z axis. Assuming a monochromatic wave propagating in the positive z direction, (i.e., $k_z>0$), the field incident on the mask 36 can be approximated as a time-harmonic or phasor field $g(x,y)$ in an x-y plane transverse to the optical axis z. For the present example, only scalar diffraction is considered and field quantities are represented as complex scalars. The extension to vector diffraction and coupled electric and magnetic vector fields is straightforward for one of skill in the art. The field in the plane may be characterized by its two-dimensional angular spectrum, which is the two-dimensional Fourier transform of $g(x,y)$ with respect to the spatial variables x and y.

$$G(f_X, f_Y) = \qquad\qquad\text{Eq. 2}$$
$$\mathcal{F}\{g(x,y)\} = \int_{-\infty}^{\infty}\!\!\int g(x,y)\exp[-j2\pi(f_Xx+f_Yy)]dxdy$$

The input electromagnetic field at the mask 36 may be regarded to be a plane wave originating from a distant light source on axis, such that the incident field, $g(x, y)$, can be represented as unity for all values x and y, and the spectrum, $G(f_x, f_y)$, can be denoted as $\delta(f_x)\delta(f_y)$. In the illustrated implementation, the mask, $h(x, y)$, is a rectangular Cartesian lattice of apertures or holes. In the following discussion, the apertures are taken to be circles of radius, a. The radius and effective path length of the apertures can be selected such that the mask produces a desired output field, $h_D(x,y)$, from the input field, $g(x, y)$. For example, the desired output field can be a spatially white field, that is a field in which all spatial frequencies are present with roughly equal amplitude. Thus, the appropriate mask design can be determined by solving for the complex gains, $\{a_{mn}\}$, where $a_{mn}$ is the complex gain of aperture (m,n) in the rectangular lattice, in the following:

$$h_D(x,y) = \qquad\qquad\text{Eq. 3}$$
$$\sum_{m=-\infty}^{\infty}\sum_{n=-\infty}^{\infty} a_{mn}\delta\!\left(\frac{x}{\Delta_X}-m\right)\!\delta\!\left(\frac{y}{\Delta_Y}-n\right)*circ\!\left(\sqrt{\left(\frac{x}{a}\right)^2+\left(\frac{y}{a}\right)^2}\right)$$

$$\text{where } circ(\sqrt{x^2+y^2}) = \begin{cases} 1 & \sqrt{x^2+y^2}\le 1 \\ 0 & \text{otherwise} \end{cases} \qquad\text{Eq. 4}$$

Taking the Fourier transform of each side:

$$H_D(f_X, f_Y) = \qquad\qquad\text{Eq. 5}$$
$$\sum_{m=-\infty}^{\infty}\sum_{n=-\infty}^{\infty} a_{mn}\exp[-j(m\Delta_Xf_X+n\Delta_Yf_Y)]\frac{J_1(2\pi\sqrt{(af_X)^2+(af_Y)^2})}{\sqrt{(af_X)^2+(af_Y)^2}}$$

where $J_p(\cdot)$ is the $p^{th}$ order Bessel function of the first kind.

The Airy term on the right side is independent of the variables of summation and can be moved to the left side:

$$\frac{H_D(f_X, f_Y)\sqrt{(af_X)^2 + (af_Y)^2}}{J_1(2\pi\sqrt{(af_X)^2 + (af_Y)^2})} = \qquad \text{Eq. 6}$$

$$\sum_{m=-\infty}^{\infty}\sum_{n=-\infty}^{\infty} a_{mn}\exp[-j(m\Delta_X f_X + n\Delta_Y f_Y)]$$

The right side comprises a superposition of Hermitian orthogonal kernel functions, and each coefficient can be extracted by a generalized inner product, specifically an inverse Fourier transform. Multiplying both sides by $\exp[j(m\Delta_X f_X + n\Delta_Y f_Y)]$ and integrating gives the desired value for the complex gains of the apertures.

$$a_{mn} = \frac{1}{2\pi}\int_{-\infty}^{\infty}\int \frac{H_D(f_X, f_Y)\sqrt{(af_X)^2 + (af_Y)^2}}{J_1(2\pi\sqrt{(af_X)^2 + (af_Y)^2})} \qquad \text{Eq. 7}$$

$$\exp[j(m\Delta_X f_X + n\Delta_Y f_Y)] df_X df_Y$$

An alternate approach would be to abandon exact field synthesis for field approximation under some criterion, such as a minimum $L_2$ norm (least-squares) reconstruction. Such an approach leads also to a formal closed-form solution for the optimal complex gains $\{a_{mn}\}$ for the apertures.

The output field is then provided to a negative refractive index lens 40 that preserves the evanescent field created at the mask 36 and focuses it onto a photodetector array 42 in a focal plane. By a "negative refractive index lens," it is intended to encompass any of a number of engineered metamaterials or natural materials having both an electric permittivity and a magnetic permeability that are negative for a desired range of frequencies. In the illustrated embodiment, the negative refractive index lens 40 is a Pendry slab lens positioned such that an infinitesimal gap exists between the mask 36 and the lens.

The above analysis assumes that the distant light source lies on the optical axis. For a second distant light source 44 that is off the optical axis, for example, in the y=0 plane, the received field would have an incident field, $g_2(x, y),=\exp(f_X'x)$, and spectrum, $G(f_X, f_Y)=\delta(f_X-f_X')\delta(f_Y)$. Because the mask is multiplicative, the linear phase shift term $\exp(f_X'x)$ appears in the output field $h_{D2}(x, y)$, and the output's angular spectrum is shifted by the amount, $f_X'$, along the $f_X$ axis. Accordingly, optical displacements are preserved by the mask operation, and the received energy from the first light source 32 and the second light source 44 will be represented as respective separate focal points of a fraction of a wavelength in width at the focal plane 42.

Figure 3:
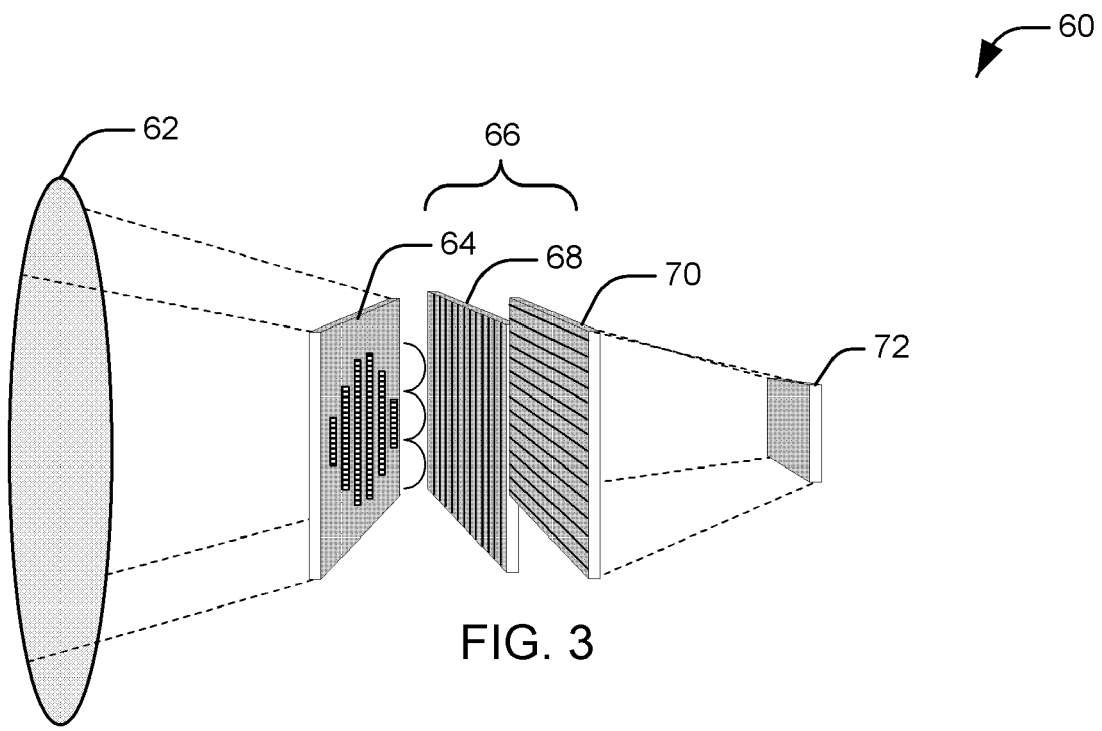
FIG. 3 illustrates an implementation of a telescope system in accordance with an aspect of the present invention.

FIG. 3 illustrates an implementation of a telescope system 60 in accordance with an aspect of the present invention. The telescope system 60 includes a lens 62 that collects light from one or more distant light sources and directs the light onto a mask 64. In the illustrated implementation, the mask 64 comprises a sheet of material, opaque at a band of wavelengths associated with the one or more distant light sources, that has a plurality of apertures. The mask spatially samples the incident electromagnetic field representing the light sources across the plurality of apertures to produce an evanescent field output. The complex gain, that is, the amplitude and applied phase shift, of the electromagnetic field at each of the plurality of apertures can be controlled by varying the diameter and effective path length of each aperture. For example, the apertures can be angled or coiled to increase their length, as well as loaded with a dielectric material that is transparent at a band of frequencies associated with the light source to slow the passage of the signal through the aperture. The complex gain at each aperture is selected to produce an evanescent field having a full angular spectrum to facilitate focusing at a negative refractive index lens assembly 66.

In the illustrated example, the negative refractive index lens assembly 66 comprises a first plate 68 having a thin-film layer of silver and a second plate 70 having a thin-film layer of silver. It will be appreciated that the layer of silver first and second plates 68 and 70 can be layered onto a dielectric material, for example, by a vapor deposition process. The silver layer on the first plate 68 comprises an etched grating aligned in a first direction. The passage of the evanescent field through the grating focuses the evanescent field along one transverse axis as a plurality of intermediate fields. The silver layer on the second plate 70 can comprise an etched grating aligned in a second direction to focus the intermediate fields aligned along the transverse axis to a point in an associated focal plane.

For example, if the evanescent wave is assumed to be propagating along the z-axis, the first and second plates 68 and 70 can be positioned parallel to the x-y plane. The first plate 68 can have a grating aligned parallel to the y-axis to focus the evanescent field into a plurality of intermediate fields along the x-axis, and the second plate can have a grating aligned parallel to the x-axis to focus the intermediate fields to one or more focal points on the focal plane. It will be appreciated that the two-stage focusing process represented by the first and second plates 68 and 70 permits the use of multiple planar lens components as an alternative to a single volumetric (e.g., three-dimensional lens). One skilled in the art will appreciate that a single, three-dimensional lens assembly could be utilized as the illustrated negative refractive index assembly 66. A photodetector array 72 can be positioned in the focal plane to detect the focused light. It will be appreciated that the described telescope 60 can achieve resolution superior to that of a diffraction limited system of comparable size. Accordingly, the resolution of the photodetector array 72 can be selected to allow for high resolution imaging of the light focused from the negative refractive index lens assembly 66.

Figure 4:
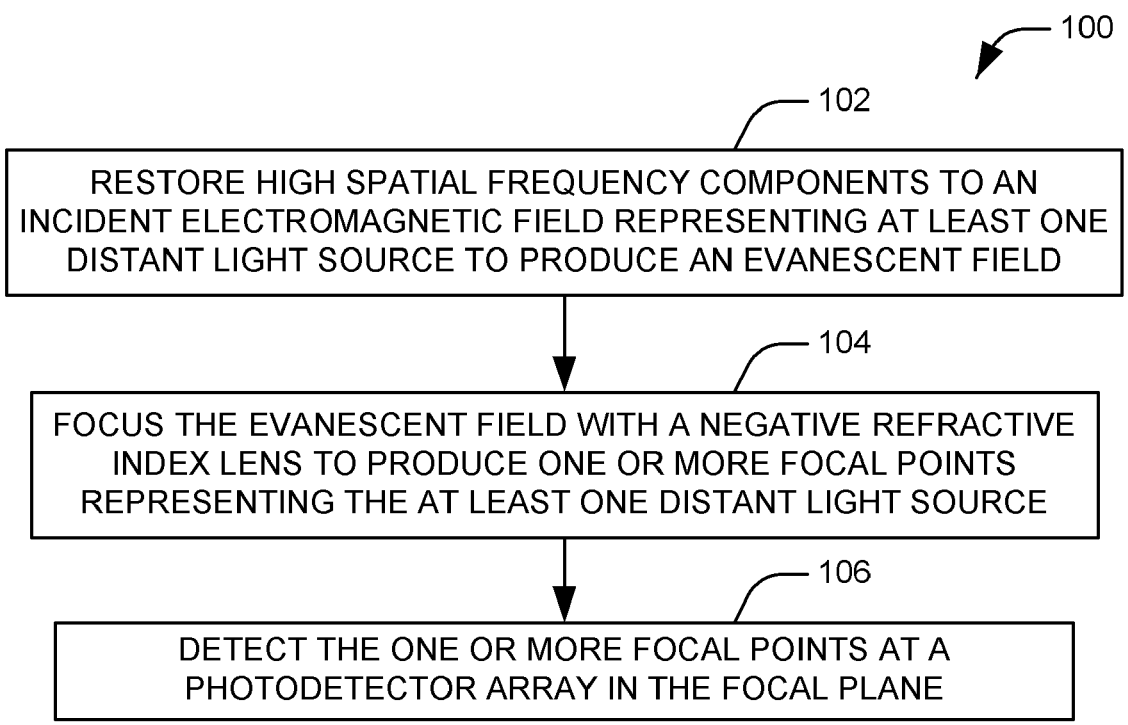
FIG. 4 illustrates a methodology for imaging at least one distant light source in accordance with an aspect of the present invention.

FIG. 4 illustrates a methodology 100 for imaging at least one distant light source in accordance with an aspect of the present invention. At 102, high spatial frequency components are restored to an incident electromagnetic field representing the at least one distant light source to produce an evanescent field. For example, the incident light can be directed to a mask having a plurality of apertures. Each of the apertures in the mask can vary in diameter and effective path length to control, respectively, the amplitude and phase of the evanescent field at that aperture.

At 104, the evanescent field is focused onto a focal plane with a negative refractive index lens. The evanescent field, generally speaking, will attenuate, leaving only a single, substantially uniform field in a very small distance (e.g., on the order of a wavelength). Accordingly, the negative refractive index lens should be positioned as to allow only an infinitesimal gap between the lens and the source of the evanescent field to preserve and focus the field into respective focal points representing the at least one distant light source. In an exemplary embodiment, the lens can comprise one or more lens structures formed from metamaterials engineered to have a negative refractive index for a band of wavelengths associated with the at least one light source. The focused signal is then detected by a photodetector array in the focal plane at 106.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. An imaging system having an enhanced resolution, comprising:
    an evanescent field generator configured to receive an incident electromagnetic field representing at least one distant light source and restores high spatial frequency components to the incident electromagnetic field, resulting in an evanescent field, the evanescent field generator comprising a plate with a plurality of apertures arranged in a grid, where the diameter and effective path length of each of the plurality of apertures being selected to apply a desired transfer function to an incident electromagnetic field representing the at least one distant light source such that a first aperture of the plurality of apertures has a different effective path length than a second aperture of the plurality of apertures;
    a negative refractive index lens assembly that focuses the evanescent field onto a focal plane; and
    a photodetector assembly located in the focal plane that detects the focused evanescent field as an image of the at least one distant light source.

2. The system of claim 1, at least one of the plurality of apertures being filled with a dielectric material as to provide the selected effective path length at the at least one aperture.

3. The system of claim 1, the negative refractive index lens assembly comprising:
    a first lens that focuses the evanescent field into respective intermediate fields along a first transverse axis; and
    a second lens that focuses the intermediate fields into a single focal point having a width less than an associated wavelength of the at least one distant light source.

4. The system of claim 3, wherein the first lens comprises a plate having a thin-film layer of silver with a grating aligned in a first direction and the second lens comprises a plate having a thin-film layer of silver with a grating aligned in a second direction.

5. The system of claim 1, further comprising a preconditioning lens, having a positive index of refraction that directs light from the at least one distant light source to the evanescent field generator.

6. A method for imaging at least one distant source of light, comprising:
    restoring high spatial frequency components to an incident electromagnetic field representing the at least one distant light source to produce an evanescent field;
    focusing the evanescent field with a negative refractive index lens onto a focal plane, wherein focusing the evanescent field with a negative refractive index lens comprises directing the light through a first lens to focus the evanescent field into respective intermediate fields aligned longitudinally along a first transverse axis and directing the light through a second lens to focus the intermediate fields into at least one focal point having a width less than an associated wavelength of the at least one distant light source; and
    detecting the focused evanescent field in the focal plane.

7. The method of claim 6, wherein restoring high spatial frequency components to an incident magnetic field comprises directing incident light from the at least one distant source of light at a mask comprising a plurality of apertures, where the diameter and effective path length of each of the plurality of apertures is selected to apply a desired transfer function to an electromagnetic field representing the at least one light source.

8. The system of claim 1, wherein the negative refractive index lens comprises a Pendry slab lens.

9. A spatial frequency reconstruction assembly for focusing light from a distant light source, comprising:
    a mask comprising a plurality of apertures, where the diameter and effective path length of each of the plurality of apertures is selected to apply a desired transfer function to an incident electromagnetic field representing the at least one distant light source to produce an evanescent field such that a first aperture of the plurality of apertures has a different effective path length than a second aperture of the plurality of apertures; and
    a negative refractive index lens assembly, having at least one surface separated by an infinitesimal gap from a surface of the mask, that focuses the evanescent field to a focal plane associated with the negative refractive index lens.

10. The assembly of claim 9, the plurality of apertures being arranged in a rectangular grid on the mask.

11. The assembly of claim 9, at least one of the plurality of apertures being filled with a dielectric material as to provide the selected effective path length at the at least one aperture.

12. The assembly of claim 9, the negative refractive index lens assembly comprising:
    a first lens that focuses the evanescent field into respective intermediate fields along a first axis; and
    a second lens that focuses the intermediate fields into a single focal point having a width less than an associated wavelength of the at least one distant light source.

13. An imaging system having an enhanced resolution, comprising:
    an evanescent field generator configured to receive an incident electromagnetic field representing at least one distant light source and restores high spatial frequency components to the incident electromagnetic field, resulting in an evanescent field;
    a negative refractive index lens assembly that focuses the evanescent field onto a focal plane, the negative index of refraction lens assembly comprising a first thin-film layer of silver with a grating aligned in a first direction that focuses the evanescent field into respective intermediate fields along a first axis and a second thin-film layer of silver with a grating aligned in a second direction that focuses the intermediate fields into a single focal point having a width less than an associated wavelength of the at least one distant light source; and
    a photodetector assembly located in the focal plane that detects the focused evanescent field as an image of the at least one distant light source.

* * * * *